United States Patent Office 3,331,480
Patented July 18, 1967

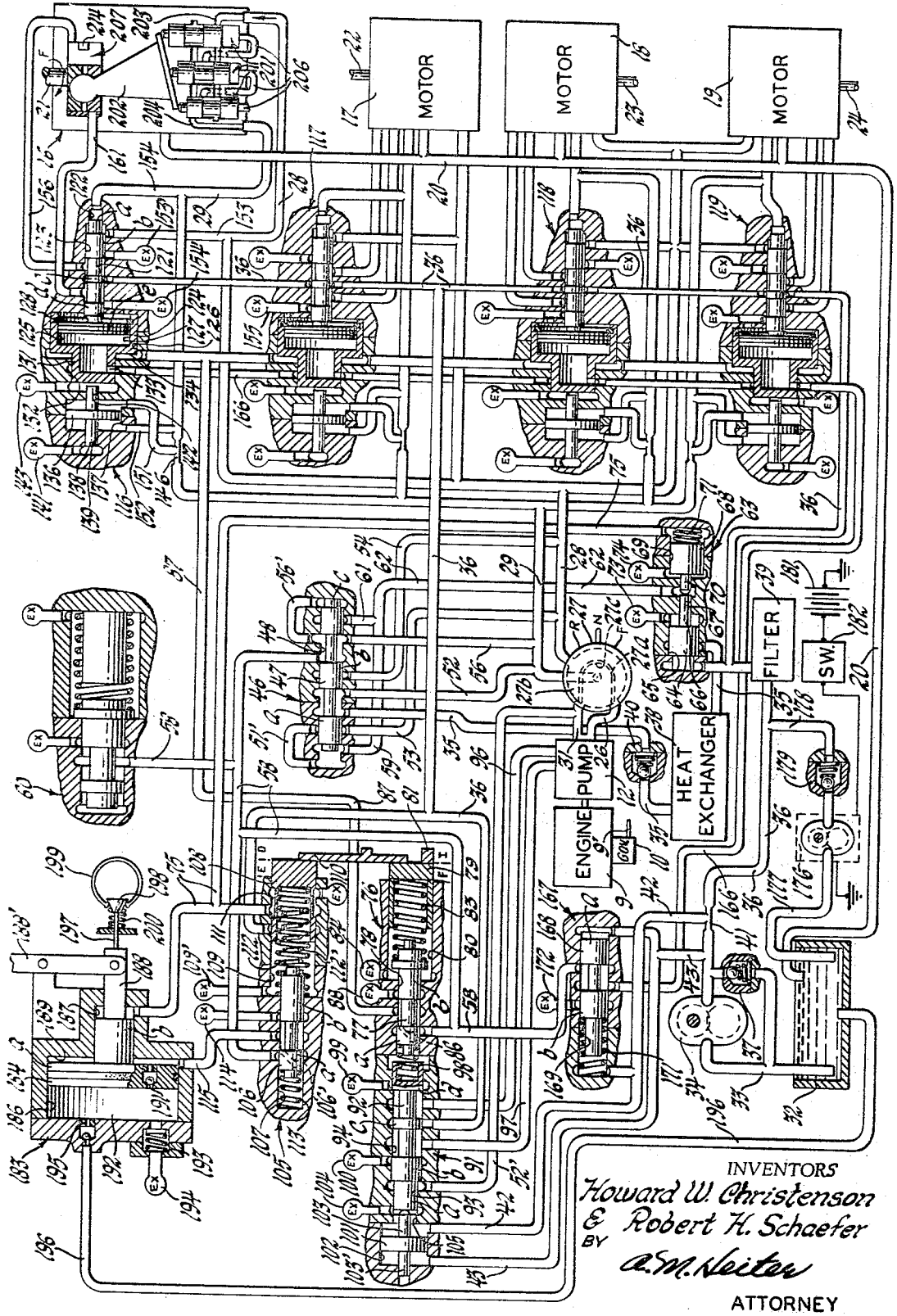

3,331,480
PUMP AND ROTARY FLUID MOTOR TYPE TRANSMISSION AND BRAKE
Howard W. Christenson, Indianapolis, and Robert H. Schaefer, Westfield, Ind., assignors to General Motors Corporation, Detroit, Mich., a corporation of Delaware
Filed Sept. 27, 1963, Ser. No. 312,026
13 Claims. (Cl. 192—4)

This invention relates to vehicle and transmissions and more particularly to a hydrostatic transmission and vehicle brake control system.

A hydrostatic transmission power circuit illustrating the invention includes a variable displacement pump connected by a manual reversing valve to a plurality of variable displacement fluid motors. The pump displacement is controlled by increasing engine speed to increase displacement and increasing throttle pedal position to decrease displacement to provide a gradually increasing pump displacement to full pump displacement. The displacement of each of the motors is controlled by a motor displacement valve acted on by throttle pressure and high motor return flow to decrease the displacement and power circuit pressure to increase the displacement. The system provides full motor displacement while the pump displacement is increasing and when the pump displacement has reached a maximum value, and at which point the system pressure reaches the minimum value, the motor displacement control valves thereafter reduce the motor displacement within limits to maintain a power circuit system pressure at a minimum proportional to throttle pedal position. The pump displacement control valve is acted on with an increasing force provided by the throttle pressure valve increasing with brake pedal position to reduce the pump displacement. This is preferably done by arranging the brake pedal linkage so that the linkage increases the throttle pressure in the same manner that the throttle linkage increases the throttle pressure. The high pressure in the power circuit under braking conditions acts on the pump displacement control valve to urge the valve to the increased displacement position to provide a force proportional to the brake pedal position. Thus increasing brake pedal position or brake demand proportionally increases pump inlet pressure during braking to increase engine braking to a maximum value as limited by maximum engine speed. At maximum engine speed during braking, the motor valves function to bypass the motor, displacement valves bypass high power circuit pressure to the low power circuit pressure to provide additional hydraulic throttling braking transferring power to heat in the fluid which is dissipated by the whole system. The brake pedal also actuates upon further movement a brake servo system to apply power actuated vehicle friction brakes to provide vehicle braking to supplement the hydrostatic braking and to provide braking in the event of failure of the hydrostatic braking system.

The flow in the power circuit return from each motor is controlled by a venturi flow balancing system to reduce motor displacement in response to high return flow to balance the flow to the motors to prevent loss of power by the motor carrying a load due to overspeeding of an unloaded motor.

The control pressure varies with high system pressure and is boosted on brake application. For a push start, the system is charged by an electric pump.

An object of this invention is to provide in a hydrostatic transmission adapted to be driven by an engine, improved controls for automatically selecting the correct engine speed to provide optimum efficiency for each torque demand position and to automatically control the pump and motor displacement throughout the entire operating range to maintain the correct engine speed for optimum efficiency.

Another object of the invention is to provide in a hydrostatic transmission having variable displacement pump and motor units, a displacement control valve having one area responsive to power circuit pressure and another one responsive to power circuit flow.

Another object of the invention is to provide in a vehicle having a vehicle brake and a hydrostatic transmission, control means responsive to brake demand to control the transmission to provide braking and to apply the vehicle brake.

Another object of the invention is to provide in a vehicle having a vehicle brake and a hydrostatic transmission having a pump and a motor and adapted to be driven by an engine, transmission control means operative in response to brake demand to reduce the pump displacement in response to increasing brake demand as opposed by the power circuit pressure during brake operation and to proportionally apply the vehicle brakes.

Another object of the invention is to provide in a hydrostatic transmission having a pump and a plurality of motors, a venturi flow balancer in the power circuit connection to each motor having a high pressure connection and a low pressure throat connection to balance the flow to each motor to insure positive drive of each motor at substantially the same speed.

These and other objects of the invention will be more apparent from the following description and drawing of the preferred embodiment of the invention.

The drawing is a schematic showing of the power plant and hydrostatic transmission and the control system therefor.

Referring to the drawing illustrating a hydrostatic transmission employing the invention, the engine 9, which has a conventional throttle actuated by a linkage 9' to control the fuel feed and speed and a speed limiting governor 10 to limit the fuel feed and thus the speed to a maximum value, drives through a shaft (not shown) the hydrostatic transmission variable displacement pump 12 which is connected by a power circuit, having supply and return lines, to drive the right variably displacement transmission motors 16 and 17 and the left variable displacement transmission motors 18 and 19 having output shafts respectively, 21, 22, 23 and 24, driving traction devices. The pumps and motors may be any suitable hydrostatic pump and motor transmission component which provide, on driving the shaft of a unit, a hydraulic output pressure and provide, on the supply of a hydraulic fluid under pressure to a unit, rotation of the shaft. Each unit also has means to vary the displacement. The preferred hydraulic pump and motor unit and the hydrostatic pump and motor assembly are disclosed in application S.N. 279,372, entitled, "Transmission," filed by Howard W. Christenson et al., May 10, 1963, now Patent No. 3,273,344.

Motor 16 illustrates a typical pump or motor construction. The motor 16 has four piston and cylinder valve assemblies 201 in conventional annular arrangement with the fourth in back of the center one. Each of the pistons engages the disc portion of the swash plate 202. The motor supply line 28 is connected to intake manifold 203 connected to the intake port of each cylinder. Each cylinder also has an exhaust port connected to an exhaust manifold 204 connected to return line 29. A passage 205 connects a controlled port in each cylinder located between the intake and exhaust ports to the closed end of the preceding cylinder with reference to the forward direction of rotation of the motor. The ball end of swash plate 202 is universally mounted in the cylinder of displacement control motor 207 which is rotatably mounted on the output shaft 21 which is rotatably mounted in the housing. The stop 214 limits movement of the control piston in the control cylinder to limit minimum displacement. When fluid is supplied via line 28 the piston valves control flow from manifold port 203 to passages 206 to successively supply each cylinder to rotate the motor to drive shaft 21 as shown by the arrow F. The line 20 drains the motor housings to the sump 32.

This new control system may be used in any hydrostatic transmission system having a pump and motor or motors each of which is provided with hydraulic displacement control and a power circuit connecting the pump and motor, as shown for example in Wahlmark 2,373,723 and 2,383,092 and Norman 2,431,071.

The pump and motors are connected by a hydraulic power circuit. The pump 12 when driven by the engine, supplies fluid under pressure to the pump outlet line 26 which is connected by the manual reversing valve 27 when in the forward position to the motor supply line 28, which is connected to each of the motors. The return fluid in the power circuit is conducted from the motors when driving forward by the return line 29 which is connected through the reversing valve 27 to the pump inlet line 31. In neutral position, shown, the reversing valve 27 interconnects the pump outlet and inlet lines and the motor supply and return lines to permit freewheeling of the transmission. In reverse position, the reversing valve connects the pump outlet line 26 to the motor return line 29 to drive the motors in reverse direction and connects the fluid returning via the motor supply line 28 to the pump inlet line 31. A conventional reversing valve is shown in the above Patent No. 3,273,344, and an improved valve in S.N. 306,436, filed Sept. 4, 1963. The reversing valve 27 has a cup-shaped body 27a with ports in the side wall to receive lines 26, 28 and 31 located, as shown, and a port in the center of the base to receive line 29. The cover 27b seals the top of the cup body and has an L-shaped passage 27c selectively connecting the ports for lines 31 and 26 in forward and reverse, respectively, to the port in the base connected to line 29. When one of lines 31 and 26 is connected by passage 27c to line 29, the other is connected by the space in the cup to line 28. In neutral, passage 27c partially overlaps ports for lines 26 and 31 to interconnect all four lines.

Charging and make-up fluid is supplied to the power circuit to charge and make up leakage and control fluid is supplied to the control system from a sump 32 located in the base of the housing for pump 12 via the pump inlet line 33 by the charge pump 34, which is driven by the engine 9 proportional to engine speed, to supply fluid to the main line 36. A pressure release valve 37, connected to main line 36, regulates the pressure or limits the pressure in the main line 36 to a maximum value and returns the excess to inlet line 33 or sump 32. Main line 36 has a filter 39 therein and is connected to the control pressure regulator valve 63 which regulates the pressure in main line 36 and connects the overage or excess fluid to cooling feed line 35 which is connected through heat exchanger or cooler 38 and one-way or check valve 40 to the cooling supply valve 46.

A venturi 41, located in the main line 36, provides a low and high governor pressure. The low pressure governor line 42, which is connected to the throat of the venturi, provides the low governor pressure which decreases with increasing flow through the venturi due to increasing speed of pump 34 or engine speed. The high pressure governor line 43 is connected to the main line 36 just upstream of the venturi 41 to provide a high governor pressure increasing with increasing pump or engine speed.

*Cooling supply valve*

The cooling supply valve 46 is employed to supply make-up fluid to the power circuit and has a valve element 47 having lands a, b and c of equal diameter located in a closed bore 48. In the forward drive position, the high pressure motor supply line 28 is connected by lines 53 and 51' to the left end of the bore 48 and acts on land a to move the valve to the position shown where the cooling feed line 35 is connected between the lands a and b to the branch 52 to supply fluid to the motor return line 29. The branches 53, 54 and 61 are closed, respectively, by the lands a, b and c. The pump inlet line 29 has branches 56 and 56' connected to the line as a common point with branch 56' connected to the end of the bore acting on the land c. Since pressure in the motor return line 29 is substantially less than the pressure in the motor supply line 28, this pressure conducted by branches 56 and 56' to act on land c cannot overcome the higher pressure in line 28 acting on land a and the valve position is not affected. Branch 56 is connected between the lands b and c to the control line 58 and the pressure in this line is limited to a low value, i.e., 150 p.s.i., by the regulator valve 60. The high pressure from the motor supply line 28 is also connected by branches 53 and 51', bore 48, and branch 59 to the power circuit pressure line 62 to act on the control pressure regulator valve.

In reverse drive with reversing valve 27 in reverse position, the higher pressure in motor return line 29 is connected by branches 56 and 56' to act on the end of land c to move the valve element 47 to the opposite end of bore 48 connecting this higher pressure via branch 61 to power circuit pressure line 62 to control the control pressure regulator valve. The cooling feed line 35 is then connected between lands a and b to line 53 to motor supply line 28 now at the lower pressure. Branches 59, 52 and 56 are blocked by lands a, b and c respectively.

When the transmission is in forward drive and the load drives the engine, as during forward coasting of a vehicle in forward drive, the motors are overrunning the pump and engine, and the motor return line 29 and pump inlet line 31 have a higher pressure than the motor supply line 28 of the power circuit. Then the high pressure in branch 56 acting on the land c moves the valve element 47 to the opposite end of the bore and provides the same connections as described above for reverse. Similarly in reverse drive, when the load drives the engine on reverse overrun, the higher pressure in supply line 28 places the cooling valve element 47 in the above described forward position.

*Control pressure regulator valve*

The control pressure regulator valve 63 regulates the pressure in main line 36 employed to control the pump and motor displacement. This valve 63 has a valve element 64 located in a bore 65. A reduced diameter stem 66 which may be integral with or abut valve element 64 extends into the small bore 67. A plug 68 is located in bore 69 and has a stem 70 extending into small bore 67. A spring 71 in bore 69 biases plug 68 so stem 70 contacts stem 66 to bias valve element 64 against main line pressure from line 36 acting on the opposite end of valve element 64 to close the valve blocking line 35. On an increase of main line 36 pressure, the valve opens connecting line 36 to cooling supply line 35. The spring regulates the pressure at a normal minimum value, i.e., 150 p.s.i. The power circuit pressure line 62 is connected to bore 67 between stems 66 and 70 and acts at a high pressure, i.e., up to 5000 p.s.i. to disable the biasing spring and regulate main line pressure at increasing values with increased power circuit pressure. The stem has about one-tenth the area of the valve element so main line pressure above the normal minimum value is one-tenth of the higher power circuit pressure. Exhausts 73 and 74 vent the ends of bores 65 and 69 adjacent small bore 67. The brake slack take-up line has a branch 75 connected to the spring chamber end of bore 69 to act on plug 68 to increase the biasing force of spring 71 to increase the normal minimum pressure to a higher value, i.e., 500 p.s.i.

Throttle valve

The throttle lever 81 provides a torque demand signal to actuate the control valve 76 to provide a throttle pressure proportional to throttle position or torque demand called a torque demand pressure or signal. The throttle lever alone or with valve 76 is the torque demand means. The brake lever provides a brake torque demand signal and also acts on valve 76 to at other times provide a brake torque demand signal or generically a demand signal and thus the brake lever alone or with valve 76 is brake torque demand means. The valve 76 has a regulator valve element 77 having lands $a$ and $b$ located in bore 78 and a plunger 79 located in counterbore 80. A lever member 81 which is part of the fuel or throttle control linkage and is movable from the engine idle position I, shown, to the engine full throttle position F cooperates with plunger 79 to increase the biasing force of spring 83 acting on the regulator valve element 77 with increasing fuel supply to the engine. The displacement valve spring 98 acts on the regulator valve 77 to provide a small return force sufficient at idle to return the throttle regulator valve to the closed position for zero throttle pressure. Exhaust 84 vents the space between valve element 77 and plunger 79. When the throttle pressure in throttle pressure line 87 has the desired proportion to the throttle control position, throttle pressure connected by branch passage 86 to bore 78 acts on the left end of land $a$ and with spring 98 to balance the biasing force of spring 83, the valve is in the closed position blocking low pressure feed line 58 with land $a$ and exhaust 88 with land $b$. On an increase of the biasing force or a decrease in T.V. pressure, valve element 77 will move to the left connecting the feed line branch 58 to the throttle line 87 and blocking exhaust 88. On a reduction in throttle position to provide a reduction in throttle pressure, the feed line 58 is blocked and the throttle line 87 is connected to exhaust 88. The throttle pressure increases in proportion to increasing engine throttle position or torque demand.

Pump displacement control valve

The pump displacement control valve 91 controls the displacement of the transmission power pump 12 and has a valve element 92 having a small land $a$ located in bore portion 93 and lands $b$, $c$ and $d$ of equal diameter located in a bore 94. In the neutral position of this valve, as shown, the main or displacement control line 36 is connected to the bore 94 at the point blocked by land $c$. The decrease pump displacement line 96 is connected between lands $c$ and $d$ to exhaust 99. The increase pump displacement line 97 is connected between lands $b$ and $c$ to exhaust 100. The valve element 92 is biased to the left or decreased displacement position by spring 98 located between the displacement control valve 92 and the throttle pressure regulator valve 77, and by the throttle pressure supplied by passage 86 also acting between these valves to connect main line 36 to decrease displacement line 96 A governor plug 101 located in a coaxial spaced bore 102 is closed at both ends. The plug has fixed thereto a stem 103 acting on the left end of land $a$ of valve element 92. The stem 103 freely moves in an aperture in the wall 105 between bores 93 and 102. The wall and stem prevent passage of fluid between these bores, and the bore 93 is provided with exhaust 104 at this wall. A stem 103' extends from the opposite side of plug 101 into an open bore to guide the plug 101 and provide balanced areas on opposite sides of plug 101. Since the high governor pressure supplied by line 43 to act on the end face of plug 101 increases with increasing engine speed and is always greater than the low governor pressure, which decreases with increasing engine speed, is supplied by line 42 to the right end of this plug, the governor pressure acts to the right to move the valve element 92 to an increased displacement position connecting main line 36 to increase displacement line 97.

The pump inlet line 31 of the power circuit is also connected by a branch line 52' to the space between the lands $a$ and $b$ to bias the valve 92 for increased displacement. On an increase of the throttle control to supply more fuel to the engine 10 for increased torque demand, the throttle pressure via passage 86 moves pump displacement valve 92 to the decreased displacement position unloading the engine and permitting engine speed to increase. With increased engine speed, the high governor pressure increases to move valve 72 to the increased displacement position. The normal operation on increasing the throttle finally results in increasing the engine speed and pump displacement.

Brake valve

The brake valve 105 has a regulator valve element 106 having lands $a$ and $b$ located in bore 107 and brake valve 108 located in a larger counterbore 109 vented by exhaust 109'. When the brake pedal is moved to apply the brakes, the brake linkage portion 110 moves the throttle valve 79 and the brake valve 108 from the brake disengaged position D to the brake engaged position E. Movement of the brake valve from the disengaged position toward the engaged position during a first increment of movement, i.e., one inch, is only against the bias of outer spring 112 and moves groove 111 to connect main line 36 to brake slack take up line 75 without friction brake application. As explained below, the throttle valve during this movement initiates hydrostatic transmission braking. Then valve 108 engages the inner spring 112' and acts through inner spring 112' to provide and to increase the biasing force on regulator valve 106 to move the regulator valve against the force of spring 113 and the brake apply pressure connected by passage 106' in land $a$ of valve element 106 to the closed end of bore 107. Fluid under the higher of the pressures in power circuit motor supply and return lines 28 and 29 is supplied by the cooling valve as explained above to supply line 58. When the brake linkage 110 moves brake valve 108 to apply the brakes, land $b$ closes exhaust 114 and connects supply line 58 between lands $a$ and $b$ to brake apply line 115 to provide a regulated brake apply pressure proportional to apply movement of the brake pedal or brake torque demand in the second range of movement. As pointed out above, the brake regulator valve does not supply a regulated pressure during the initial or first range of movement. The brake pedal and valve and associated controls connected to the friction brakes and the transmission provide brake control means or brake torque demand means.

Motor displacement valves

There is a motor displacement valve 116, 117, 118 and 119, respectively, connected to each of the motors 16, 17, 18 and 19. The motors on at least one axle, such as motors 16 and 18, are blocked so that displacement reduction is limited to a low value, i.e., one-fourth displacement. Since each of these valves is constructed in the same manner, the following description and reference numerals applies to each motor displacement valve. The valve element 121 has a land $a$ of small diameter located in a small bore portion 122, lands $b$, $c$ and $d$ of intermediate equal diameter located in an intermediate diameter bore portion 123, and a large land $e$. An auxiliary valve element 124 is located in a large bore portion 126 and has a large internal bore 127 open at one end in which a land $d$ reciprocally fits to provide a sealed chamber 125. Relative reciprocating movement of the land $d$ and its associated valve element 121 with respect to the auxiliary valve element 124 is limited by a snap ring 128 at the open end of the internal bore 127 and the opposite end of bore 127 of the auxiliary valve element 124. The auxiliary valve element 124 has extending from the opposite side a cup shaped stem 131 of smaller diameter fitting into the small diameter bore 132 and a passage or port 133 connected through the side wall of the stem and the interior thereof to the bore 127. A governor plug 136 is located in bore 137. The plug 136 has a stem secured thereto and extending from both sides. One end of the stem 138 is guided in a bore 139 which is vented by exhaust 141 to permit free movement of plug 136. The other end of the stem is guided in bore 142 and abuts auxiliary valve member 124. The space between the portion of stem 138 and the stem 131 of auxiliary valve member 124 is vented by exhaust 143. The bores 122, 123, 126, 132, 139 and 142 in the valve body 129 and the bore 127 in auxiliary valve element 124 are coaxial.

The motor return line 29 has in the connection to each motor a venturi 146 with a first flow signal line 151 connected to the throat of the venturi to provide a first signal pressure inversely proportional to flow and a second flow signal line 152 connected between the venturi restriction and the motor to provide a second signal pressure inversely proportional to flow. The first flow signal line 151 is connected to the bore 137 of the respective motor displacement valve to act on the right side of governor plug 136 to provide a bias force for increased displacement. The second flow signal line 152 is connected to act on the left side of governor plug 136 to bias the valve assembly to decrease the displacement. The venturi signals act on the governor plug to increase the bias on the valve assembly to decrease the displacement with increasing return flow from the motor or increasing motor speed. The above venturi and associated lines provide flow signal means producing a hydraulic signal and with the governor plug 136 provide flow signal means producing a mechanical signal. There is a similar venturi 146 in each of the branches of return line 29 connected to each motor. A first flow signal line 151 is connected to the throat of each venturi 146 and a second signal line 152 is connected to each return line branch upstream of the venturi during return flow to similarly act on governor plug 136.

The branch of motor supply line 28 connected to each motor has a branch control line 153 connected to bore 123 of each motor displacement valve to act on the differential area of land *b*. The branch of motor return line 29 connected to each motor has a branch control line 154 connected to bore 122 to act on the end area of land *a*. The differential area of land *b* is the same as the area of land *a*. Thus both the motor supply and return line pressure bias motor displacement valve element 121 to increase displacement. Since one of lines 153 and 154 always has high power circuit pressure, the lines and lands *a* and *b* provide high pressure signal means. The main line 36 is connected to the valve bore 123 at a point blocked by the land *c* in the valve in the central position, shown. Also with the motor displacement valve element 121 in the central position, displacement increase line 156 is blocked between lands *b* and *c* as land *b* blocks exhaust 153 and motor displacement decrease line 161 is blocked between lands *c* and *d* with land *d* blocking exhaust 154'. The valve element on movement to the left connects main line 36 to displacement increase line 156 and displacement decrease line 161 to exhaust 154 to increase motor displacement and on movement to the left connects main line 36 to displacement decrease line 161 and displacement increase line 156 to exhaust 153' to decrease displacement. Also note that exhaust 154' also vents bore 126.

The exhaust 155 vents fluid in the bore 126 between both valve element 121 and the auxiliary valve element 124 and the shoulder between bores 126 and 123. The brake controlled and throttle controlled pressure line 87 is connected to the end of bore 126 at bore 132 of each motor displacement valve to act on the face 134 of auxiliary valve element 124 at stem 131 to provide a bias for decreasing displacement. The governor signal pressure is a line pressure supplied at all normal operating speeds via line 166 and is connected to the bore 132 of each valve element and passes through the passage 133 to the sealed chamber 125 within the auxiliary valve element 124 which is closed by the land *d* of the valve element 121 to normally hold the two valve elements in the extended position shown. With the valve elements extended by governor signal pressure, the shoulder 134 engages the upper end of bore 126 to limit movement of the two element valve assembly to prevent land *a* from moving out of bore 122 and connecting the supply and return flow signal lines 153 and 154. Whenever the engine speed exceeds a safe value, i.e., 5000 p.s.i., the governor relay valve 167 exhausts governor signal line 166 to permit the motor control valves to contract to reduce the length of the two-unit valve assembly to interconnect the supply and return pressure signal lines 153 and 154 to provide hydraulic braking as explained below.

In each of the motor displacement valves 116 to 119, the signal pressure, which varies directly with the pressure in the respective motor supply and return lines is connected respectively to act on the lands *b* and *a* of valve element 121 to urge the valve element in an increased displacement direction. The throttle pressure acting on the upper face of auxiliary valve element 124 tends to move the motors in a decreased displacement direction. The venturi 146 in return flow line 29 acting on plug 136 with increasing return flow provides an increasing bias to decrease displacement.

The power circuit pressure is limited to a maximum value, i.e., 5000 p.s.i., by the motor displacement valves. When the power circuit pressure reaches this maximum value, the signal pressures in lines 154 and 153 acting on lands *a* and *b* of valve element 121, will provide a force sufficient to collapse the valve assembly moving valve element 121 and particularly land *d* into auxiliary valve element 124 expelling the low pressure, i.e., 100 p.s.i., fluid from chamber 125 and moving land *a* out of bore 122 to connect the higher pressure line of motor supply line 28 and motor return line 29 to the lower pressure, i.e., 100 p.s.i., line.

Governor relay valve

The governor relay valve 167 has a valve element 168 having lands *a* and *b* located in a bore 169. The spring 171 biases the valve element 168 to the position shown connecting the low pressure feed line 58 to the governor signal line 166. When the governor pressures exceed a value indicating that the engine is operating at a speed in excess of the particular design speed, such as the full power speed or a safe speed, the high governor pressure in line 43 acting on land *a* overcomes the low governor pressure in line 42 and the biasing force of spring 171 acting in the opposite direction on land *b* to move the valve element 169 so that land *a* blocks pressure line 58 and governor signal line 166 is connected between the lands to exhaust 172.

Push start pump

An electric motor driven pump 176 having an intake line 177 pumps fluid through outlet line 178 having a check or one-way valve 179 to the main line 36 to supply fluid to the system when pump 34 does not supply fluid, i.e., when the engine is not running or when pump 34 fails. Pump 176 operates when the battery or other power supply 181 is connected by switch 182 to actuate the electric motor driven pump 176.

Brakes

The brakes are actuated by a hydraulic motor 183 controlled by the brake pedal 110 controlled valve 105. The motor 183 has a stepped piston 184 having a large portion *a* and a small portion *b* located in a bore closed at the ends and stepped to provide a large portion 186 and a small portion 187 for the large and small piston portions, respectively. The piston rod 188 fixed to the piston portion b extends axially out of the end of small bore portion 187. The slack take up line 75 is connected to small bore 187 to act on the small end area of piston portion b to provide a low force for initial slack take up of the brake mechanism. This force is sufficient to overcome the brake reaction springs and may also provide an initial low braking force. Quick slack take up response is provided since one-way valve 191 quickly transfers fluid from low pressure chamber 192 to apply chamber 189. The brake apply line 115 which provides a pressure proportional to brake pedal position is connected to the apply chamber 189 of the large bore 186 to act on the larger differential area of land a to provide a large brake apply force proportional to brake pedal position. The pressure in the apply chamber holds one-way valve 191 closed and fluid is exhausted from the low pressure chamber 192 through low pressure relief valve 193 to exhaust 194. The check or one-way valve 195 is closed by this low pressure. To reduce the brake pressure, line 115 is connected by the brake valve to exhaust 114. The brake retraction springs return piston 184 and the suction and preferably also gravity draw oil from the sump 32 via line 196 and one-way valve 195 to the low pressure chamber 192 to keep this chamber full so that the check valve 191 may function for quick slack take up response.

The piston rod 188 actuates the conventional vehicle brakes having retraction springs. The illustrated example shows a cable 197 connecting the rod 188 to brake cam 198 which actuates internal brake band or shoe 199. The retraction spring 200 abuts a frame portion and biases the cam to the released position. The manual lever 183′ suitably pivoted to the frame and the piston rod may be used as an emergency brake.

*Operation*

When the manual valve 27 is in the neutral position, the pump outlet line 26, pump inlet line 31, motor supply line 28 and motor return line 29 forming the power circuit are interconnected at the valve to unload the pump 12 and all motors 16, 17, 18 and 19 so no power can be transmitted in either direction. This completely unloads the engine 10 and permits freewheeling of the output or vehicle for coasting and towing.

For forward drive, the manual valve 27 is moved to the forward position FWD connecting pump outlet line 26 to motor supply line 28 and the motor return line 29 to the pump inlet line 31. With the engine idling and the throttle control in idle position, the pump displacement control valve 91 will be in the decreased displacement position holding the transmission pump 12 at zero displacement so no fluid under pressure is supplied to the power circuit by pump 12. The pump displacement valve 91 is held in the decreased displacement position by the spring 98 since the very low governor pressures acting on governor plug 101 and the low, i.e., 100 p.s.i., pump inlet pressure supplied from pump inlet line 31 by line 52′ and acting on land b are insufficient to move the valve against spring 98. The line 52′ and land b may be called the low pressure signal means. At engine idle speed, the engine driven pump, which supplies a volume of fluid proportional to engine speed, supplies a low volume reducing the venturi 41 is low and there is little difference between the high and low governor pressures and only a small force exerted on governor plug 101. The pump 34 via main line 36 and cooling valve 46 in either position fills the power circuit with a low pressure, i.e., 100 p.s.i. which acts via line 52′ on the small differential area of land b. Both of these pressures are insufficient to overcome spring 98, so pump displacement valve is in decrease displacement position and the pump at zero displacement.

To transmit power, the throttle is increased to supply more fuel to the engine to increase engine speed and to actuate throttle valve 76 to increase throttle pressure in line 87. The increased throttle pressure initially tends to decrease displacement, but the resulting increased engine speed increases the governor pressure sufficiently to overcome the throttle pressure and the biasing spring 98 to move the displacement valve to increase pump displacement gradually to maximum pump displacement at full power. With increasing throttle position and engine speed throttle pressure and governor pressure balance the pump displacement control valve 91 to control the pump displacement to maintain the proper engine speed proportional to the torque demand as indicated by the throttle position or throttle opening for maximum engine efficiency at each throttle opening.

The operation at partial power requirements is similar, but the pump displacement would only increase to a pump displacement value proportionate to the power requirement. For example, at half power, the pump displacement would increase to half pump displacement at about one-fourth throttle opening and thereafter remain constant at half pump displacement.

As the pump displacement increases, the volume of oil pumped by the pump increases and is supplied to the motors. With the engine idling, the charge pump 34 having filled the power circuit and the control circuit as explained above, the motor displacement control valves 116, 117, 118 and 119 will place the respective motors 16, 17, 18 and 19 in the maximum displacement position. The motor displacement control valves will be in the increased displacement position connecting the main line 36 to the increased motor displacement line 156 to provide full motor displacement, since the charging pressure supplied by line 35 to the power circuit is regulated by regulator valve 60 at a low value, i.e., 100 p.s.i., and is connected from the motor supply line 28 via signal line 153 to act on the end of the land b and from the motor return line 29 via signal line 154 to act on the land a to place the valve to the increased displacement position. At this time, since the engine is not overspeeding, the low control pressure in line 58 regulated by valve 60 at a low value, i.e., 100 p.s.i., is connected by governor valve 167 via governor line 166 to the chamber 125 to place the two-part motor displacement valve assembly in the extended position. With the valve assembly in extended position, the end face 134 of auxiliary valve element 124 abuts the adjacent end wall of bore 126 to keep land a in bore 122 to prevent an interconnection between the signal lines 153 and 154. At idle, the throttle pressure is zero or very low and thus the connection of the throttle pressure via line 87 to the end of the bore 126 acting on the differential area of auxiliary valve element 124 does not provide a force sufficient to move the motor controlled valve to the decreased displacement position. Thus the valve under idling conditions will be in the increased displacement position.

As the throttle is advanced to increase engine speed, pump displacement increases to increase the flow of fluid in the power circuit to the motors, the pressure in the power circuit immediately rises to a high maximum value, i.e., 5000 p.s.i., as explained above, by the motor displacement valves, to provide a high starting torque to start the load or vehicle. As the throttle is advanced up to a partial throttle, i.e., half throttle, increasing the pump displacement as explained above, the motors accelerate the load or vehicle increasing its speed and the pressure in the power circuit decreases quickly at first and then at a progressively slower rate on a curve similar to the transmission torque curve. In forward drive, the motor return line 29 is connected at the throat of venutri 146 to signal line 151 and upstream thereof to signal line 152 to provide pressures acting on the governor plug 136 of the motor displacement valve to bias the motor displacement valve to a decreased displacement position in proportion to flow through the return line or motor. The throttle pressure, which increases with increased throttle opening, acts on the auxiliary valve element 124 to bias the motor valve to the decreased displacement position.

In the lower portion of the throttle range, for example, to half throttle, and while the power system pressure is above a minimum value, i.e., 1500 p.s.i., the power system force acting on the motor displacement control valve overcomes the throttle force and holds the motor displacement valve in the increased displacement position to maintain the motor in the full displacement position. When the power system pressure tends to fall below 1500 p.s.i., which occurs at about full power half output speed, the throttle pressure overcomes the power circuit pressure acting on the motor displacement valve and moves the motor displacement valve to decrease the motor displacement. At full throttle, the balance of the throttle pressure and power circuit pressure on the motor displacement valve will gradually reduce the motor displacement in mean high throttle position, i.e., half throttle and full throttle, to maintain a constant minimum power system pressure, i.e., 1500 p.s.i. At reduced throttle openings, a proportionately lower power system pressure will be maintained by further reducing the motor displacement. At part throttle operation, it is preferred that two of the motors may reduce to zero displacement and thus cease driving. The displacement reduction of another pair of motors on one axle will be limited by stops 214 to a low value, i.e., one-fourth displacement, to insure continuous drive without freewheeling and to motor the engine for braking service.

For reverse drive, the manual valve 27 is moved to the reverse position REV to connect the pump outlet line 26 to the motor return line 29 to drive the motors in the reverse direction. Then the motor supply line 28 acts to return the fluid via manual valve 27 to the pump inlet line 31. Since the return line 29 is now the high pressure line supplying power circuit fluid to the motors, the power circuit flow signal to the motor displacement control valves is obtained from the venturi 146 in the power circuit connection of line 29 to each motor and conducted by the signal lines 151 and 152 to the bore 137 to act on the governor plug 136 of the motor displacement control valve for each motor. Though during reverse drive the signal line 152 is downstream of the throat of venturi 146 the differential between the signal pressures will not be too different and suitable to measure flow through the motors particularly for limited reverse drive usage. In all other respects the system operated in reverse in the same manner as explained above for forward drive.

For brake operation, the brake pedal is actuated to move the portion of the brake linkage 110. During a first increment of movement, i.e., one inch, the linkage operates the brake valve 108 to connect main line pressure from line 36 to slack take up line 75 to act on piston portion 184b to take up slack and main regulator valve plug 68 to increase line pressure. This first increment of movement also actuates throttle valve 77 to provide a brake demand pressure in line 87 proportional to brake pedal movement. The power circuit pressure acting on lands $a$ and $b$ of the motor displacement valves will be above 1000 p.s.i. and thus sufficient. The flow bias of governor plug 136 and the brake demand has to move the valves to the increased displacement position to increase the displacement of the motors to maximum displacement so that they deliver maximum oil flow due to the rotation of the load or movement of the vehicle. The increased oil flow from the motor provides flow and pressure in return line 29 of the power circuit which is connected by manual valve 27 to the pump inlet line 31 to motor the pump and engine. The movement of the brake pedal also causes the brake linkage 110 to engage the head 79 of the throttle valve 76 to increase the throttle pressure or now brake demand pressure in line 87 proportional to the brake demand during full brake control movement.

The brake demand pressure also acts on the pump displacement valve 91 to move the pump displacement valve to the decreased displacement position. The increased pressure in pump inlet line 31 due to the rotation of motors is connected by line 52' to act on the land $b$ of the pump displacement valve 91 to oppose the increased brake demand force. Since the pressure line 52' is a measure of the braking effort or brake effort being provided by the engine and the throttle valve pressure is a measure of the brake pedal position or brake demand, the pump displacement valve 91 will adjust the pump displacement to motor the engine at a speed consistent with brake pedal position thus increasing the braking effort with increased brake pedal position. As increased braking is desired, the brake pedal is further depressed to further increase throttle pressure and the pump control valve 91 continues to further reduce the pump displacement thereby raising the pressure required to motor the engine at governed speed and increasing the resulting brake torque. Continued movement of the brake pedal moves linkage 110 into the second range of movement and brake valve 108' acts on spring 112' so regulator valve 106 provides a pressure to line 115 to actuate the brake motor to start friction brake application. Further movement of the brake pedal increases the brake apply pressure for increased friction braking simultaneously with the increased hydrostatic braking. The final increment of brake lever movement causes member 79 to engage throttle valve 77 to engage pump displacement valve 93 and hold it at minimum displacement. Then power circuit pressure reaches the maximum, i.e., 5000 p.s.i., in lines 29 and 154 to act on land $a$ of valve 121 collapsing chamber 125 to blow off line 29 via lines 154 and 153 to line 28 for maximum braking. The maximum engine braking torque is limited by the maximum pressure on the wheel motors. Thus the full design braking torque is available at any vehicle speed. The engine is motored at governed speed during extended braking to provide maximum engine braking. This speed obtains maximum friction horsepower or braking effort from the motor by dissipating heat through the regulator or motor displacement valves and also insures maximum cooler flow for extended brake operation. Additional hydraulic braking is obtained by the blow off at the motor displacement valves. The heat energy from braking is dispersed through the entire hydraulic system rather than being concentrated on a few surfaces. Consequently, the thermal inertia is higher than in conventional brakes. However, adequate cooling must be provided by the heat exchanger 38. The cooling control valve 46 circulates fluid through the heat exchanger during braking operation as explained above. Since during this engine braking operation the pump speed is always in the high portion of the speed range and generally at maximum engine speed for maximum braking, the governor pressure acting on the pump displacement valve is fairly constant. However, as the governor bias on this valve decreases with decreasing engine speed, the governor pressure also provides a bias proportional to braking effort opposing the brake demand bias provided by brake lever 110.

When during braking operation the engine speed reaches the governed limit, the governor valve 167 dumps the governor pressure in line 166 to exhaust 172 to exhaust the chamber 125 of the motor displacement valves permitting the two-part motor displacement valve assembly to contract to withdraw the land $a$ from the bore 122 to interconnect the flow signal lines 153 and 154 to permit flow from the higher pressure return line 29 via signal line 154 through the motor displacement valve to line 153 and the lower pressure supply line 28. This bypassing of the high pressure side of the power circuit to the low pressure side through a throttled passage provides additional braking effort and reduces the power circuit flow so less fluid pumped by the motors is supplied to the pump 10 and thus the engine speed is reduced.

The venturi flow balancer insures positive drive to each wheel under uneven traction conditions. When the transmission is operating in forward as explained above, the motor supply passage 28 conducts high pressure power circuit fluid to each of the motors. In the branch line connected to each motor there is a venturi 146 which, at its throat, has a connection to the flow signal line 151 which is operative on governor plug 136 of the motor displacement valve for the associated motor. When the load on a driving motor is released, which would occur in a vehicle for example when a wheel loses traction, the motor would speed up under no load conditions and there will be a high rate of fluid flow in the branch of line 28 to that motor through the venturi 146 reducing the pressure in line 151 and increasing pressure in line 152 to the motor displacement control valve governor plug for the overspeeding motor. When the flow pressures acting on the governor plug of the motor displacement valve is reduced, and the throttle pressure acting on valve element 124 remains constant, the motor displacement valve assembly will be moved toward the decreased displacement position proportional to flow in line 29 thus reducing the displacement and power to the overspeeding motor. This reduction of the oil power to the unloaded and overspeeding motor helps to distribute the load or obtain better traction to drive the load and prevents loss of power to the other motors due to bypassing of power circuit fluid through an overspeeding motor.

During reverse operation the venturi flow balancing system will work in the manner except that the supply to the motors is now conducted through return line 29, which also has in each branch a venturi 146 in the branch to each motor, and a flow signal line 151 from the throat of this venturi to act on the land b of the associated motor displacement valve for each motor. When this pressure on the motor displacement valve drops, the throttle pressure will similarly reduce the motor displacement.

In this control sytsem, during forward and reverse operation, the throttle pressure balances the quantity of oil pumped with the quantity of oil used in each motor at all times. The controls automatically select the correct engine speed to provide optimum efficiency for each throttle position and automatically control the pump and motors throughout the entire vehicle operating range to maintain this engine speed. The venturi flow balancing system described above provides an interwheel differential action. If one motor output or wheel loses its load as by loss of traction, there is a flow interlock that insures positive drive power to each wheel. The flow balancing system prevents one motor running away and using all the oil provided by the pump at an excessive speed and slows down the rotation of this motor and associated wheel to obtain better traction. Thus the wheels that have traction will be maintained at the normal displacement value providing the proper speed and the speed of the wheel losing load will be reduced by reducing the displacement substantially to the same power value.

The above described preferred embodiment is illustrative of the invention which may be modified within the scope of the appended claims.

We claim:

1. In a variable ratio drive assembly for connecting an engine to drive a load, the combination of:
 (a) a transmission having a drive member to be driven by an engine and a driven member to be connected to drive a load providing a plurality of drive ratios between said drive and driven members;
 (b) friction brake means operably connected to brake said driven member;
 (c) brake control means operably connected to said transmission and to said friction brake means and including a brake control member movable from a disengaged position through first and second ranges of brake demand movement and being operable in one of said ranges of movement of said control member to control both said transmission to connect said driven member to said drive member to drive the drive member for motoring an engine for braking the driven member for braking a load and said friction brake to maintain said friction brake disengaged and operative in another of said ranges of movement of said control member to control both said friction brake to engage said friction brake for friction braking and said transmission to continue to connect said driven member to drive said drive member for motoring an engine for continued engine braking of a load.

2. The invention defined in claim 1 and said brake control means being automatically operable to limit drive member speed to a predetermined maximum speed value for limiting engine motoring speed.

3. The invention defined in claim 1 and said brake control means being automatically operable to control said transmission to limit the drive member speed to a predetermined maximum speed value for limiting engine motoring speed and additional means to provide additional braking in response to the drive member speed being limited at said maximum speed value.

4. The invention defined in claim 1 and said brake control means being operable on movement of said control member from said disengaged position to an initial range of movement to control said transmission to connect said driven member to said drive member to motor an engine at increasing speeds relative to driven member speed to provide increasing braking with increased movement of said control member from the disengaged position and operative in a continuing range of movement of said control member to control said transmission to drive said drive member for motoring said engine at further increasing speeds relative to said driven member speed to provide increased engine braking and to engage said friction brake means to provide increased braking with further movement in said second range of movement from said disengaged position.

5. In a drive combination for driving a load;
 (a) an engine;
 (b) a hydrostatic transmission having a drive member driven by said engine, a driven member connected to drive said load and variable displacement pump and motor means connecting said members to provide a plurality of drive ratios between said drive and driven members;
 (c) friction brake means operably connected to brake said driven member;
 (d) brake control means operably connected to said friction brake means and said transmission operable in one range of movement to control said variable displacement pump and motor means to connect said load to said engine to motor said engine and operative in another range of movement to engage said friction brake and to control said variable displacement pump and motor means to motor said engine.

6. The invention defined in claim 5 and said control means including means to limit the speed of said motor during motoring for braking.

7. In a drive assembly for driving a load;
 (a) an engine;
 (b) a hydrostatic transmission having a drive member driven by said engine, a driven member connected to drive said load and variable displacement pump and motor means including interconnecting high and low pressure power passage means connecting said members to provide a plurality of drive ratios between said drive and driven members;
 (c) friction brake means operably connected to brake said driven member;
 (d) brake control means operably connected to said friction brake means and said transmission operable to connect said load to said engine to motor said engine and to engage said friction brake means and to interconnect said high and low pressure power passage means to provide additional hydraulic braking.

8. The invention defined in claim 7 and said brake control means being operable on movement from a disengaged position in an initial range of movement to control said pump and motor means to connect said load to said engine to motor said engine at increasing speeds to provide increasing braking of said load with increasing movement from the disengaged position and operative in a continuing second range of movement to control said pump and motor means to further increase the motoring speed of said engine for increased engine braking and to engage said friction brake means to provide increased braking with further movement in said second range of movement and on further movement from said disengaged position operative to interconnect said high and low power passage means to provide hydraulic braking and to limit engine speed to a safe value.

9. In a power plant;
 (a) an engine;
 (b) hydraulic transmission means having drive means driven by said engine, driven means, pump means driven by said drive means, motor means driving said driven means, power circuit means connecting said pump and motor means to supply fluid from said pump means to said motor means and return fluid from said motor means to said pump means, and pump and motor displacement varying means to vary the displacement of said pump and motor means respectively;
 (c) torque demand means for controlling torque demand of said engine movable from a low to a high torque demand position;
 (d) brake demand means for providing braking movable from a disengaged position to a high braking position;
 (e) demand signal means responsive to said torque demand means and said brake demand means for providing a demand signal increasing with increasing torque demand and increasing brake demand;
 (f) governor means connected to said pump means and responsive to the speed of said pump means for providing a speed signal proportional to pump speed;
 (g) signal means connected to said power circuit to provide a pressure signal proportional to power circuit pressure;
 (h) pump and motor displacement control means operative in response to torque demand signal, speed signal, and pressure signal for controlling pump and motor displacement to provide optimum operating conditions for said engine;
 (i) and means responsive to said brake demand means to hydraulically apply vehicle friction brakes in proportion to brake demand.

10. The invention defined in claim 9 and said pressure responsive means being a venturi in said power circuit means having a throat connected pressure biasing said control means to increased displacement and an upstream pressure biasing said control means to decreased displacement.

11. In a power plant;
 (a) an engine;
 (b) hydraulic transmission means having drive means driven by said engine, driven means, pump means driven by said drive means, motor means driving said driven means, power circuit means connecting said pump and motor means to supply fluid from said pump means to said motor means and return fluid from said motor means to said pump means, and pump and motor displacement varying means to vary the displacement of said pump and motor means respectively;
 (c) torque demand means for controlling torque demand of said engine movable from a low to a high torque demand position;
 (d) brake demand means for providing braking movable from a disengaged position to a high braking position;
 (e) demand signal means responsive to said torque demand means and said brake demand means for providing a demand signal increasing with increasing torque demand and increasing brake demand;
 (f) governor means connected to said pump means and responsive to the speed of said pump means for providing a speed measure signal proportional to pump speed and a safe speed signal indicating when the safe speed has been exceeded;
 (g) low pressure signal means connected to said power circuit to provide a low pressure signal proportional to low power circuit pressure;
 (h) high pressure signal means connected to said power circuit means to provide a high pressure signal proportional to high power circuit pressure;
 (i) flow signal means connected to said power circuit means providing a flow signal proportional to flow through said motor means;
 (j) pump displacement control means operative in response to torque demand signal to decrease displacement with increasing torque demand, speed measure signal to increase displacement with increasing speed, and low pressure signal to increase displacement with increasing pressure for controlling pump displacement;
 (k) motor displacement control means operative in response to said flow signal means, torque and brake demand means to decrease displacement with increasing flow and torque and brake demand, and responsive to said high pressure signal to increase displacement with increasing pressure and overcontrolled by said safe speed signal to increase displacement when said safe speed is exceeded;
 (l) and means responsive to said brake demand means to hydraulically apply vehicle friction brakes in proportion to brake demand.

12. The invention defined in claim 1 and said one range of movement of said brake control member being the low brake demand range and said other range of movement being a higher range of brake demand.

13. The invention defined in claim 1 and said brake control means being operative on movement of said control member from said disengaged position in a range of increased brake demand positions to control the transmission ratio between said driven member and drive member to increase drive member speed relative to driven member speed to provide increased engine braking with increased brake demand.

References Cited
UNITED STATES PATENTS

| | | | |
|---|---|---|---|
| 2,489,450 | 11/1949 | Crookston | 91—413 |
| 2,673,552 | 3/1954 | Franceschina | 91—413 |
| 2,872,000 | 2/1959 | Herndon et al. | 192—4 |
| 2,927,475 | 3/1960 | Burckhardt | 192—4 X |
| 2,968,379 | 1/1961 | Kelly | 192—4 |
| 2,990,925 | 7/1961 | Bernotas | 192—4 |
| 2,997,144 | 8/1961 | Gsching et al. | 192—4 |
| 3,017,974 | 1/1962 | Lasley | 192—4 |
| 3,036,434 | 5/1962 | Mark | 60—53 |
| 3,161,023 | 12/1964 | Margolin et al. | 60—53 |

BENJAMIN W. WYCHE III, *Primary Examiner.*

DON A. WAITE, DAVID J. WILLIAMOWSKY,
*Examiners.*

UNITED STATES PATENT OFFICE
CERTIFICATE OF CORRECTION

Patent No. 3,331,480                                  July 18, 1967

Howard W. Christenson et al.

It is hereby certified that error appears in the above numbered patent requiring correction and that the said Letters Patent should read as corrected below.

Column 1, line 23, after "and" insert -- by --; column 9, line 61, strike out "reducing the" and insert instead -- of fluid so the flow though --; column 13, line 10, after "flow" insert -- signal --; line 24, before" manner" insert -- same --.

Signed and sealed this 2nd day of July 1968.

(SEAL)
Attest:

Edward M. Fletcher, Jr.                              EDWARD J. BRENNER
Attesting Officer                                     Commissioner of Patents